(12) United States Patent
Aila et al.

(10) Patent No.: US 9,142,043 B1
(45) Date of Patent: *Sep. 22, 2015

(54) SYSTEM AND METHOD FOR IMPROVED SAMPLE TEST EFFICIENCY IN IMAGE RENDERING

(75) Inventors: Timo Aila, Helsinki (FI); Samuli Laine, Helsinki (FI); Tero Karras, Helsinki (FI); Jaakko Lehtinen, Helsinki (FI); Peter Shirley, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 664 days.

This patent is subject to a terminal disclaimer.

(21) Appl. No.: 13/168,765

(22) Filed: Jun. 24, 2011

(51) Int. Cl.
*G06T 15/00* (2011.01)
*G09G 5/00* (2006.01)
*G06T 11/20* (2006.01)

(52) U.S. Cl.
CPC ..................................... *G06T 11/20* (2013.01)

(58) Field of Classification Search
None
See application file for complete search history.

(56) References Cited

U.S. PATENT DOCUMENTS

| | | | |
|---|---|---|---|
| 4,897,806 A | 1/1990 | Cook et al. | |
| 5,113,493 A | 5/1992 | Crosby | |
| 5,222,203 A | 6/1993 | Obata | |
| 5,239,624 A | 8/1993 | Cook et al. | |
| 5,289,565 A | 2/1994 | Smith et al. | |
| 5,299,298 A | 3/1994 | Elmquist et al. | |
| 5,357,579 A | 10/1994 | Buchner et al. | |
| 5,384,667 A | 1/1995 | Beckwith | |
| 5,402,534 A | 3/1995 | Yeomans | |
| 5,465,119 A | 11/1995 | Demos | |
| 5,684,935 A | 11/1997 | Demesa, III et al. | |
| 5,729,672 A | 3/1998 | Ashton | |
| 5,737,027 A | 4/1998 | Demos | |
| 5,809,219 A | 9/1998 | Pearce et al. | |
| 5,870,096 A | 2/1999 | Anjyo et al. | |
| 5,973,700 A | 10/1999 | Taylor et al. | |
| 5,982,385 A | 11/1999 | Fish et al. | |
| 6,034,667 A | 3/2000 | Barrett | |
| 6,211,882 B1 | 4/2001 | Pearce et al. | |
| 6,300,956 B1 | 10/2001 | Apodaca et al. | |

(Continued)

FOREIGN PATENT DOCUMENTS

| | | |
|---|---|---|
| CN | 1856805 | 11/2006 |
| CN | 101599181 | 12/2009 |
| WO | 2012115711 | 8/2012 |

OTHER PUBLICATIONS

Hou, Q., et al, "Micropolygon Ray Tracing with Defocus and Motion Blur," ACM Transactions on Graphics (TOG), vol. 29, Article 64, Jul. 2010, pp. 1-10.

(Continued)

*Primary Examiner* — Ryan R Yang (57) ABSTRACT

A method for reducing the number of samples tested for rendering a screen space region of an image includes constructing a trajectory of a primitive extending within an image which is to be rendered. A bounding volume is constructed for a screen space region of the image, the bounding volume characterized as having a bound in a non-screen space dimension which is defined as a function of the primitive's trajectory. The bounding volume is further characterized as overlapping a portion of the screen space region which is to be rendered. One or more sample points which are located within the screen space region, and which are not overlapped by the bounding volume are excluded from testing.

22 Claims, 6 Drawing Sheets

(56) References Cited

U.S. PATENT DOCUMENTS

| | | |
|---|---|---|
| 6,618,048 B1 | 9/2003 | Leather |
| 6,636,214 B1 | 10/2003 | Leather et al. |
| 6,700,586 B1 | 3/2004 | Demers |
| 6,707,458 B1 | 3/2004 | Leather et al. |
| 6,717,577 B1 | 4/2004 | Cheng et al. |
| 6,720,975 B1 | 4/2004 | Dietrich, Jr. |
| 6,811,489 B1 | 11/2004 | Shimizu et al. |
| 6,867,781 B1 | 3/2005 | Van Hook et al. |
| 6,885,384 B2 | 4/2005 | Deering et al. |
| 6,999,100 B1 | 2/2006 | Leather et al. |
| 7,002,591 B1 | 2/2006 | Leather et al. |
| 7,034,828 B1 | 4/2006 | Drebin et al. |
| 7,050,066 B2 | 5/2006 | Ohta |
| 7,061,502 B1 | 6/2006 | Law et al. |
| 7,075,545 B2 | 7/2006 | Van Hook et al. |
| 7,119,813 B1 | 10/2006 | Hollis et al. |
| 7,133,041 B2 | 11/2006 | Kaufman et al. |
| 7,133,047 B2 | 11/2006 | Pallister |
| 7,136,081 B2 | 11/2006 | Gritz et al. |
| 7,176,919 B2 | 2/2007 | Drebin et al. |
| 7,184,059 B1 | 2/2007 | Fouladi et al. |
| 7,187,379 B2 | 3/2007 | Keller |
| 7,196,710 B1 | 3/2007 | Fouladi et al. |
| 7,205,999 B2 | 4/2007 | Leather |
| 7,230,618 B2 | 6/2007 | Keller |
| 7,307,638 B2 | 12/2007 | Leather et al. |
| 7,307,640 B2 | 12/2007 | Demers et al. |
| 7,317,459 B2 | 1/2008 | Fouladi et al. |
| 7,362,332 B2 | 4/2008 | Gritz |
| 7,446,780 B1 | 11/2008 | Everitt et al. |
| 7,453,460 B2 | 11/2008 | Keller |
| 7,453,461 B2 | 11/2008 | Keller |
| 7,477,261 B2 | 1/2009 | Pallister |
| 7,483,010 B2 | 1/2009 | Bai et al. |
| 7,499,054 B2 | 3/2009 | Keller |
| 7,538,772 B1 | 5/2009 | Fouladi et al. |
| 7,576,748 B2 | 8/2009 | Van Hook et al. |
| 7,616,200 B1 | 11/2009 | Heinrich et al. |
| 7,623,726 B1 | 11/2009 | Georgiev |
| 7,697,010 B2 | 4/2010 | Pallister |
| 7,701,461 B2 | 4/2010 | Fouladi et al. |
| 7,742,060 B2 | 6/2010 | Maillot |
| 7,961,970 B1 | 6/2011 | Georgiev |
| 7,973,789 B2 | 7/2011 | Cook |
| 7,995,069 B2 | 8/2011 | Van Hook et al. |
| 8,098,255 B2 | 1/2012 | Fouladi et al. |
| 8,970,584 B1 | 3/2015 | Aila et al. |
| 2003/0083850 A1 | 5/2003 | Schmidt et al. |
| 2003/0234789 A1* | 12/2003 | Gritz ............................ 345/474 |
| 2006/0101242 A1 | 5/2006 | Siu et al. |
| 2007/0046686 A1 | 3/2007 | Keller |
| 2008/0001961 A1 | 1/2008 | Roimela et al. |
| 2008/0244241 A1 | 10/2008 | Barraclough et al. |
| 2009/0167763 A1 | 7/2009 | Waechter et al. |
| 2011/0090337 A1 | 4/2011 | Klomp et al. |
| 2012/0218264 A1* | 8/2012 | Clarberg et al. .............. 345/420 |
| 2012/0293515 A1* | 11/2012 | Clarberg et al. .............. 345/441 |
| 2012/0327071 A1 | 12/2012 | Laine et al. |
| 2013/0321420 A1 | 12/2013 | Laine et al. |

OTHER PUBLICATIONS

Laine, S., et al., "Clipless Dual-Space Bounds for Faster Stochastic Rasterization," ACM Transactions on Graphics (TOG), vol. 30, Issue 4, Article 106, Jul. 2011, pp. 1-6.

P. Haberli and K. Akeley, "The Accumulation Buffer: Hardware Support for High Quality Rendering," In Proc. SIGGRAPH 1990. pp. 309-318.

Tomas Akenine-Möller, Jacob Munkberg, and Jon Hasselgren, "Stochastic rasterization using time-continuous triangles," Proc. Graphics Hardware 2009.

Kayvon Fatahalian, Edward Luong, Solomon Boulos, Kurt Akeley, William R. Mark, and Pat Hanrahan, "Data-Parallel Rasterization of Micropolygons with Defocus and Motion Blur," Proc. High Performance Graphics 2009.

Moller., et al., "Stochastic Rasterization Using Time-Continuous Triangles," ACM, Jan. 2007, pp. 1-11.

Wang, Liqing; "Research on Algorithms of Computational Geometry in GIS"; China Master's Theses Full Text Database; Jan. 31, 2009.

McGuire, et al; "Hardware-Accelerated Global Illumination by Image Space Photon Mapping", HPG 2009, New Orleans, Louisiana, Aug. 1-3, 2009.

Linsen, et al; "Splat-based Ray Tracing of Point Clouds", Journal of WSCG 15: 51-58, 2007.

Schaufler, et al; "Ray Tracing Point Sampled Geometry", In Proceedings of the Eurographics Workshop on Rendering Techniques 2000, pp. 319-328, London, UK, 2000. Springer-Verlag.

\* cited by examiner

SYSTEM AND METHOD FOR IMPROVED SAMPLE TEST EFFICIENCY IN IMAGE RENDERING

CROSS REFERENCE TO RELATED APPLICATIONS

This application is concurrently filed with the following commonly-owned patent applications, each of which is incorporated by reference in its entirety for all purposes:

U.S. patent application Ser. No. 13/168,771, filed Jun. 24, 2011, entitled "Bounding Box-Based Techniques for Improved Sample Test Efficiency in Image Rendering;"

U.S. patent application Ser. No. 13/168,773, filed Jun. 24, 2011, entitled "Bounding Plane-Based Techniques for Improved Sample Test Efficiency in Image Rendering;" and U.S. patent application Ser. No. 13/168,784, filed Jun. 24, 2011, entitled "Clipless Time and Lens Bounds for Improved Sample Test Efficiency in Image Renderin."

BACKGROUND

The present invention relates to image rendering, and more particularly to improving sample test efficiency in image rendering applications.

The rendering of a high quality image relies upon an accurate color computation for each pixel forming the image. The accuracy of this color computation is improved by distributing sample points across each pixel, testing which sample points are overlapped by a primitive which is to be rendered in the image, and computing a color for the pixel based upon those overlapped and non-overlapped sample points.

Sample testing algorithms (sometimes referred to as "point in polygon tests") determine which samples of a screen space region (usually a pixel) are overlapped by a primitive, and the quality of such algorithms can be based upon their "sample test efficiency" (STE), this term referring to the number of sample points overlapped by a primitive versus the number of sample points tested for a given screen space region, e.g. a pixel. A high STE indicates an efficient sample testing algorithm, as a high percentage of the test sample points were actually or possibly overlapped by the primitive.

Techniques for improving STE are useful in the contexts of motion blur and depth of field rendering effects, as both types of effects involve a primitive potentially traversing a large number of pixels, resulting in a potentially large number of sample points which have to be considered for testing.

Motion blur results when the camera and/or geometry move while the virtual camera shutter is open. While the motion can theoretically be arbitrary during the exposure of a frame, it has been observed in film industry that vertex motion can often be satisfactorily simplified by assuming linear motion between shutter open (t=0) and closed (t=1).

In stochastic rasterization, the frame buffer is generalized so that each sample has additional properties in addition to the screen-space (x,y) position. In order to support motion blur, a time value is assigned to each frame buffer sample. In absence of motion, the frame buffer behaves exactly as it does currently, providing spatial antialiasing. With motion, a sample is updated only when a triangle overlaps the sample at the time of the sample.

The prior art describes several ways of interpolating a triangle to a specified time. One approach is as described in "The Accumulation Buffer: Hardware Support for High Quality Rendering," P. Haberli and K. Akeley, Proc. SIGGRAPH 1990, pgs. 309-318, and in "Data-Parallel Rasterization of Micropolygons with Defocus and Motion Blur," K. Fatahalian, E. Luong, S. Boulos, K. Akeley, W. Mark, and P. Hanrahan, Proc. High Performance Graphics 2009. This approach involves interpolating the vertices of a primitive in homogeneous clip space before triangle setup, and therefore a separate triangle setup/rendering pass is required for each distinct time. While simple to implement, this approach may not scale to a large number of samples per pixel, and the image quality can suffer due to a fixed (typically small) set of unique time values.

A second conventional approach has been to identify the screen-space bounds for the "time-continuous triangle" (TCT) for the entire exposure time, and then test all samples in all covered pixels by interpolating the triangle to the current sample's time, as described in disclosed in "Stochastic rasterization using time-continuous triangles," T. Akenine-Möller, J. Munkberg, and J. Hasselgren, Proc. Graphics Hardware 2009. Possible implementations include at least time-continuous edge functions (about 3× the cost of traditional 2D edges) and ray-triangle intersection. TCTs offer high image quality because a unique time value can be set to each sample, but an accompanying disadvantage is low STE. When a triangle moves quickly, it can cover a relatively large region on the screen, yet at the same time we expect it to cover approximately a constant number of samples regardless of motion. STE therefore degrades drastically for fast motion, and can be as low as 1% in realistic cases.

A third approach is described in U.S. Pat. No. 4,897,806, whereby exposure time is split into several strata (typically, the number of strata equals the number of samples per pixel), and the above-mentioned second approach is called for each strata. This improves STE significantly, but the efficiency of the solution is not optimal for the low sampling densities typically encountered in fast rendering graphics (4-16 samples/pixel).

In view of the shortcomings of the conventional approaches, a new method for providing improved sample test efficiency in image rendering is needed.

SUMMARY

A system, method, and computer program product for reducing the number of samples tested for rendering a screen space region of an image is presented herein. The method includes constructing a trajectory of a primitive extending within an image which is to be rendered. A bounding volume is constructed for a screen space region of the image, the bounding volume characterized as having a bound in a non-screen space dimension which is defined as a function of the primitive's trajectory. The bounding volume is further characterized as overlapping a portion of the screen space region which is to be rendered. One or more sample points which are located within the screen space region, and which are not overlapped by the bounding volume are excluded from testing.

The foregoing method finds particular application in the rendering of images, an exemplary method of which includes the aforementioned operations, and the additional operations of identifying a screen space region which is to be rendered, testing sample points which are located within the screen space region and which are overlapped by the bounding volume of the primitive, and rendering the screen space region based upon the tested sample points.

These and other features of the invention will be better understood in view of the following drawings and detailed description of exemplary embodiments.

For clarity, previously described features retain their reference indices in subsequent figures.

DETAILED DESCRIPTION OF EXEMPLARY EMBODIMENTS

As an initial starting point for the description of the present invention, per-vertex motion vectors (mv) of a primitive, e.g., a triangle, are assumed to be affine, i.e. 2D. Under this assumption, the screen-space positions of vertices during exposure can be defined as:

$$pos_{t=0} + t^* mv \quad (eq.\ 1)$$

where $pos_{t=0}$ is the position of the vertices at t=0.

Assuming the motion is affine, it follows that primitive's bounding volume can be determined separately for t=0 and t=1, and its extents interpolated linearly. As such, the bounding volume is guaranteed to contain the time-continuous triangle (or any other geometric primitive) at all times. It is therefore possible to solve the minimum and maximum time the bounding volume may overlap a tile on the screen. Once the $[t_{min}, t_{max}]$ range for a tile (e.g., a pixel or any region of an image which is to be rendered) is determined, only the samples which fall within this range need to be tested. If the samples inside a tile are arranged according to increasing time, and use stratified sampling, a relatively small set of samples may be found that are potentially overlapped by the triangle. Samples which are within the tile, but which are not overlapped by the bounding volume can be excluded from testing, thus improving the sample test efficiency for rendering the region of the image.

As used herein, the term "screen space" refers to the conventionally-known screen space of the image, the space being defined in the convention in the (x,y) dimension coordinate system. The term "non-screen space" refers to a space which is not included in the screen space of the image. Examples of such spaces/dimensions include time (t) and lens dimensions (u,v).

Figure 1A:
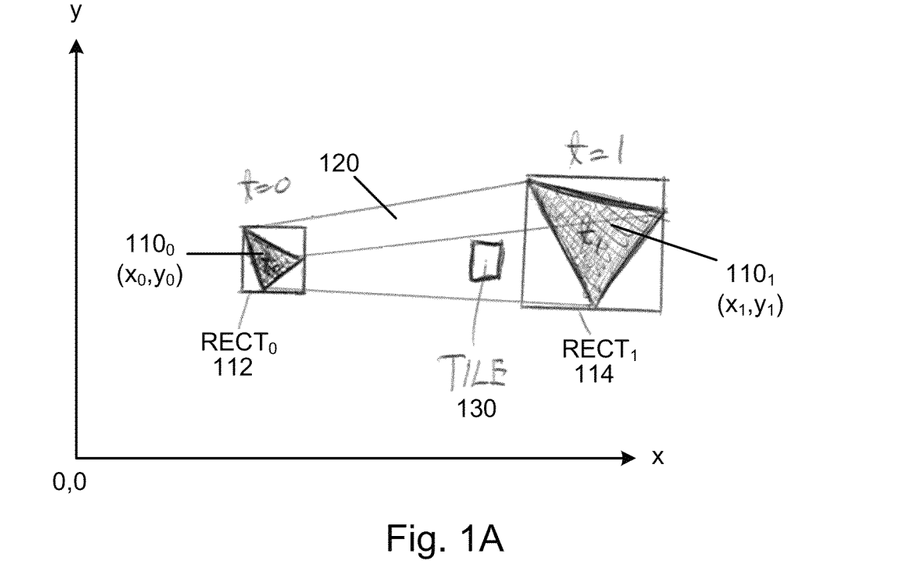
FIGS. 1A and 1B illustrates a triangle moving in screen space as a function of time in accordance with the present invention.
Figure 1B:
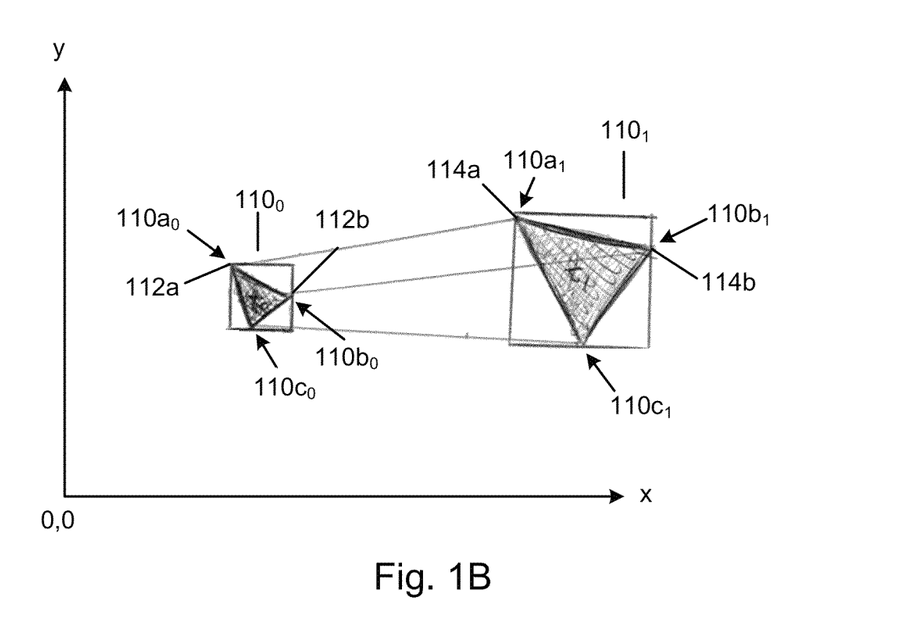

FIGS. 1A and 1B illustrates a triangle shown in screen space in accordance with the present invention. FIGS. 1A and 1B both illustrate the same triangle, although different features are illustrated in each for greater clarity. As can be seen, triangle $110_0$ is smaller than triangle $110_1$, an effect which is due to the triangle 110 approaching the camera/eye point in the illustrated embodiment. In general, the triangle 110 (or any other primitive) may undergo a change in size and/or orientation during the time span t=0 to t=1 in accordance with the present invention.

The triangle 110 is shown at position $(x_0, y_0)$ at time index t=0, and position $(x_1, y_1)$ at time index t=1, the triangle 110 identified with the references $110_0$ and $110_1$ to indicate their respective time indices. The triangle 110 undergoes motion during the time interval t=0 and t=1, the term "motion" or "screen space motion" referring to both actual motion of a primitive or apparent motion of the primitive. Screen space motion of the triangle illustrated in FIGS. 1A and 1B is an embodiment of actual motion, that is, the triangle's motion in screen space occurs as a function of time, and not as a result of viewing the triangle from different lens positions (u,v), an example of which is described below.

The triangle's motion is further characterized as having a trajectory 120 extending between the triangles $110_0$ and $110_1$. As used herein, the trajectory 120 determines a region on the screen for any (u,v,t) coordinates, so that the screen space region bounds the primitive at those particular (u,v,t) coordinates. As such, the trajectory 120 includes screen space dimensions (x,y) and at least one non-screen space dimension (u,v, t). As illustrated, the trajectory 120 defines the possible screen space paths along which the triangle 110 can take during the time span t=0 to t=1. The triangle 110 may include lens dimension coordinates (u,v) alternative or in addition to the time dimension (t). The trajectory 120 is shown as affine motion, although over types of motion, e.g., perspective correct motion, may be implemented as well in accordance with the present invention. Further, when the triangle/primitive is approximate using bounding structures (exemplary, bounding rectangles or triangles described below), the trajectory 120 refers to the extents of those bounding structures.

As shown, the trajectory 120 intersects a screen space region 130 (referred to herein as a "tile" for brevity), which may be any region in the screen space which is to be rendered, e.g., a pixel whose color/reflectance/transmittance is to be determined. The trajectory's intersection of the tile 130 indicates that the triangle may (but not necessarily) intersect the tile. The goal for this particular embodiment is to determine over what time range $[t_{min}, t_{max}]$ (or "t-bounds" as referred to herein) the triangle 110 possibly intersects or overlaps the tile 130, and to limit the testing to those samples which are overlapped by that t-bounds. This determination can be separated into two one-dimensional tests: the triangle 110 needs to overlap the tile 130 simultaneously horizontally and vertically in the (x,y) screen space. The horizontal and vertical time spans can be determined separately for horizontal and vertical movement, and an intersection between the two taken. As can be understood, each of the samples also include a non-screen space index, and in the present invention, the samples are arranged according to the screen space location, as well as their non-screen space index, e.g, time t or lens position (u, v).

As shown in FIG. 1B, each of the triangles $110_0$ and $110_1$ includes a minimum and a maximum vertex for each of the x and y planes, where the terms "minimum" and "maximum"

are relative to the vertices composing that triangle, and to the vertex's position relative to a predefined origin point of the x,y coordinate system. In the illustrated embodiment, triangle $110_0$ includes vertices $110a_0$, $110b_0$, and $110c_0$. For this triangle, vertex $110a_0$ represents the minimum vertex in the x-plane and the maximum vertex in the y-plane, vertex $110b_0$ represents the maximum vertex in the x-plane, and vertex $110c_0$ represents the minimum vertex in the y-plane. For triangle $110_1$, vertex $110a_1$ represents the minimum vertex in the x-plane and the maximum vertex in the y-plane, vertex $110b_1$ represents the maximum vertex in the x-plane, and vertex $110c_1$ represents the minimum vertex in the y-plane.

Bounding structures (illustrated in the form of bounding rectangles) $RECT_0$ and $RECT_1$ 112 and 114 are used to approximate respective triangles $110_0$ and $110_1$. Each of the bounding rectangles $RECT_0$ 112 and $RECT_1$ 114 includes low (LO) and high (HI) extents (points) for each of the x- and y-planes, these extents corresponding to the afore-described minimum and maximum vertices. For the x-plane, $RECT_0$ has a low extent 112a corresponding to the minimum x-plane vertex $110a_0$, and a high extent 112b corresponding to maximum x-plane vertex $110b_0$. Similarly, $RECT_1$ has a low extent 114a corresponding to the minimum x-plane vertex $110a_1$, and a high extent 114b corresponding to maximum x-plane vertex $110b_1$. Although the same vertex of the triangle 110 operates as the low extent vertices 112a, 114a at each of the time points t=0 and t=1 (i.e., vertex 110a for the low side and vertex 110b for the high side), this is not necessarily the case, e.g. if the triangle 110 undergoes rotation or other change in orientation during the time spam t=0 to t=1. The bounding structure which approximates the triangle (shown in FIGS. 1A and 1B as a bounding box or bounding rectangle) may be of any geometry, e.g., a triangle, exemplary embodiments of which are included in the Applicant's afore-mentioned concurrently-filed U.S. patent application Ser. No. 13/168,771, filed Jun. 24, 2011, entitled "Bounding Box-Based Techniques for Improved Sample Test Efficiency in Image Rendering." Generally, the approximating bounding structure may be any polygon in accordance with the present invention.

For the y-plane, the $RECT_0$ and $RECT_1$ would have low and high extents corresponding to the bottom and top of those boxes, respectively. In the illustrated embodiment, triangle 110 overlaps the tile 130 over the entire time span, i.e., the y/vertical extents of the triangle 110 overlap the tile 130 at each of the time points t=0 and t=1, and thus computing the overlap time for the triangle 110 in the x-plane is determinative in this example. In another embodiment in which the triangle 110 enters the tile along the y-direction after time $t_{min}$, that later entry time would re-define the $t_{min}$ point. Similarly if the triangle 110 exits the tile along the y-direction before time $t_{max}$, that earlier exit time would re-define the $t_{max}$ point.

As noted, the triangle 110 needs to overlap the tile 130 simultaneously horizontally and vertically in the (x,y) screen space. The time spans can be determined separately for horizontal and vertical movement, and an intersection between the two taken. Assuming the intersection of the two time spans exists (i.e., not a null set), the intersection of the two time spans represents the time extent of the collective bounding volume for the triangle. If the intersection of the two time spans is a null set, the triangle does not extend over the tile, and thus all of the sample points included in the tile can be excluded from testing.

It will be understood by the skilled person that the foregoing example applies equally to a description of a primitive with respect to horizontal and vertical lens dimensions (u,v), as viewing the primitive from different lens positions (u,v) will result in apparent motion of the primitive in the screen space, such apparent motion intersecting the tile 130. In this case, each frame buffer sample point is further indexed with a lens position (u, v). Depth of field is related to motion blur in the sense that when the viewing position on the lens is moved to the left or the right, this causes only horizontal movement of the vertices, and similarly for vertical movement. That is, a change in the horizontal lens coordinate (u) results in apparent movement of the primitive only in the horizontal direction, and a change in vertical lens coordinate (v) results in apparent movement of the primitive only in the vertical direction.

Figure 1C:
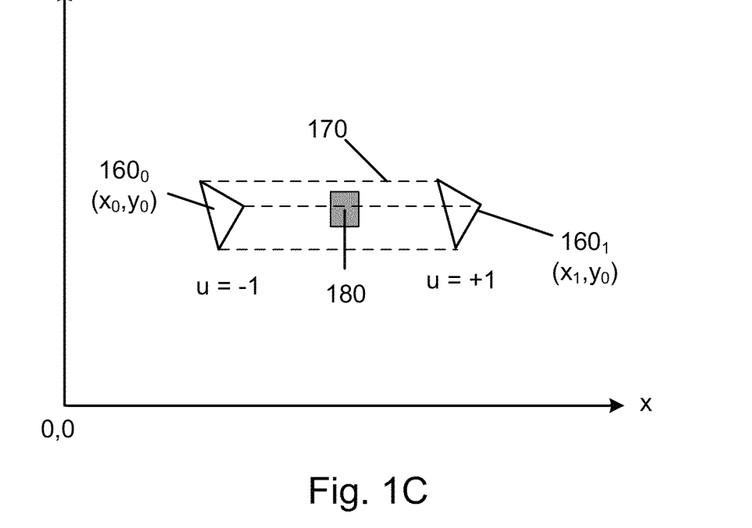
FIG. 1C illustrates a triangle exhibiting apparent motion in screen space as a function of horizontal lens dimension (u) in accordance with the present invention.

FIG. 1C illustrates a triangle exhibiting apparent motion in screen space as a function of horizontal lens dimension (u) in accordance with the present invention. Triangle 160 is shown at each of two x-positions ($x_0$) and ($x_1$) relative to two different horizontal lens positions u=−1 and u=+1, the triangle 160 identified with the references $160_0$ and $160_1$ to indicate their respective lens positions. The screen space motion of the triangle is "apparent" in this instance, as the triangle does not actual move in time, but rather its position is shifted, depending upon the lens position (u) from which it is viewed. Further particularly, the triangle 160 exhibits a screen space trajectory 170 which intersects the screen space region/tile 180 over some range of the horizontal lens dimension (u) which is to be solved.

Figure 2:
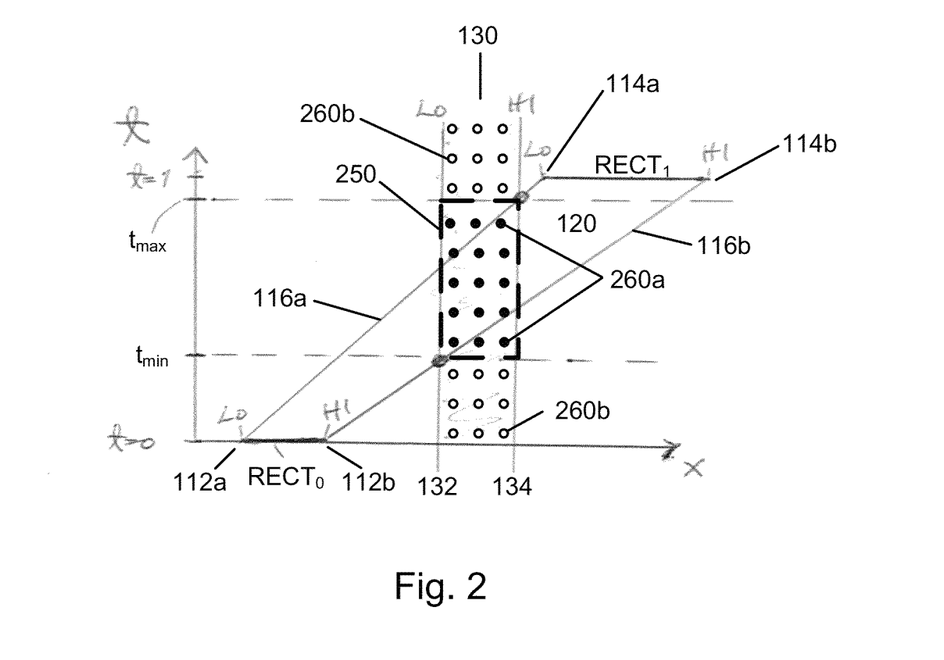
FIG. 2 illustrates the construction of a bounding volume utilizing the trajectory of a primitive in accordance with the present invention.

FIG. 2 illustrates the construction of a bounding volume utilizing the trajectory of a primitive in accordance with the present invention. The bounding volume 250 is formed per tile 130, and includes screen space bounds (shown as the extents of the tile 130 $TILE_{LO}$ 132 and $TILE_{HI}$ 134) and the non-screen space bounds (shown as t-bounds $t_{min}$ and $t_{max}$). In particular, the non-screen space bounds of the bounding volume are determined as a function of the primitive's trajectory in screen space, as will be described below. The bounding volume 250 is illustrated as an axis-aligned bounding volume or "bounding box" in which the extents of the bounding volume are aligned to axis of the coordinate system, shown in the time and screen space (x) dimensions. In a further particular embodiment, the bounding volume is a minimum bounding rectangle. The invention is not limited to a particular bounding volume and in other embodiments, the bounding volume 250 is of a different geometry, for example, a bounding capsule, cylinder, sphere or ellipsoid. In other alternative embodiments, the bounding volume is not aligned to the coordinate system and is instead an oriented bounding box or an intersection of one or more halfspaces.

The primitive trajectory 120 shown in FIG. 2 represents the (t,x) plane of the primitive's trajectory shown in FIGS. 1A and 1B. The primitive trajectory 120 is constructed according to one embodiment as follows. The trajectory's horizontal high and low extents (LO, HI) in screen space are determined at t=0 and t=1, i.e., extents 112a and 112b are determined for triangle $110_0$ and extents 114a and 114b are determined for triangle $110_1$, as shown in FIG. 1B. Assuming affine motion vectors, $RECT_{0,LO}$ interpolates linearly to $RECT_{1,LO}$ (i.e., extent 112a linearly interpolates to 114a) to form a first interpolant 116a, and similarly $RECT_{0,HI}$ interpolates linearly to $RECT_{1,HI}$ (extent 112b linearly interpolates to 114b) to form a second interpolant 116b.

These two interpolants provide the lower and upper bounds for the primitive trajectory 120. Accordingly, it can be guaranteed that the triangle 110 cannot enter the tile 130 sooner than:

$$t_{min} = (TILE_{LO} - RECT_{0,HI})/(RECT_{1,HI} - RECT_{0,HI}) \qquad \text{(eq. 2)}$$

and must leave the tile 130 no later than:

$$t_{max}=(TILE_{HI}-RECT_{0,LO})/(RECT_{1,LO}-RECT_{0,LO}) \quad (eq. 3)$$

As exemplified by equations 2 and 3 above, a non-screen space bound for the bounding volume is defined as a function of a plurality of screen space points of the primitive's trajectory. In the foregoing example, each of the non-screen space bounds $t_{min}$ and $t_{max}$ for the bounding volume 250 are defined as a function of the primitive's trajectory points $RECT_{0,LO}$ $RECT_{0,HI}$ $RECT_{1,LO}$ $RECT_{1,HI}$, these points representing the leading and trailing edges of the primitive, respectively, at each of the two time indices t=0 and t=1.

More particularly, a non-screen space bound for the bounding volume 250 is defined as function of the distance (i.e., difference) between two screen space points of the primitive's trajectory 120. In the above exemplary embodiment of equations 2 and 3, the non-screen space bound $L_{min}$ is defined as a function of a distance between the trajectory's screen space points $RECT_{1,HI}$ and $RECT_{0,HI}$, and the non-screen space bound $t_{max}$ is defined as a function of distance between the trajectory's screen space points $RECT_{1,LO}$ and $RECT_{0,LO}$. In alternative embodiments, the non-screen space dimension defined for the bounding volume may be one of the lens dimensions (u,v), as further illustrated below.

Once the non-screen space bounds are determined, the bounding volume can be constructed. In particular, the bounding volume 250 is constructed as a bounding box having a screen space dimension (the x-dimension in FIG. 2) that extends between the tile's high and low extents/bounds $TILE_{HI}$ 134 and $TILE_{LO}$ 132, and a non-screen space dimension (t in FIG. 2) which extends between the non-screen space dimension's high and low bounds.

Although not shown, the bounding volume 250 will have a corresponding representation in (y,t) coordinate system. Further exemplary, the bounding volume 250 may be constructed in any of the coordinate systems (x,t), (y,t), (x,u), or (y,v) coordinate systems. As used herein, the term "bounding volume" is not restricted to a three dimensional geometry, but includes a geometry of any dimension which operates to approximate a primitive. Exemplary, a bounding volume is a geometry of two or more dimensions which operate to at least partially envelope a primitive.

The bounding volume 250 will overlap a portion of the tile/screen space region 130 with the tile 130 having a plurality of sample points distributed thereover which may be tested for intersection by the triangle. The number of sample points ("samples" for brevity) included within the tile 130 may be any arbitrary number, ranging from 2-128, or more and may be dependent or independent of the tile's size. In a particular embodiment, the sample density per region (e.g., number of samples per pixel) is in the range of 2-32 samples per pixel, and more particularly, 4-16 samples per pixel.

Each sample is indexed in both a screen space dimension and at least one non-screen space dimension, FIG. 2 showing samples indexed in x-dimension screen space and time dimensions. The samples 260 are distributed over space (x) and time (t), i.e., different samples have different times and different locations within the tile 130, although such samples may not be tested depending upon whether the bounding volume 250 overlaps those samples, as described below. FIG. 2 illustrates the arrangement of the samples in tile 130, but it will be understood that horizontally adjacent tiles will also include sample points.

As illustrated, the bounding volume 250 overlaps some of the samples included within the tile 130 (samples 260a, darkened), while other samples are not overlapped by the bounding volume 250 (samples 260b, undarkened). Advantageously, samples 260b which are included within the tile 130 and which are not overlapped by (i.e., no included within) the bounding volume 250 are discarded or excluded from testing, thereby improving the sample test efficiency for the tile 130.

The skilled person will appreciate that the present technique has the property that when the motion is twice as fast, the $[t_{min},t_{max}]$ range for a tile becomes half as wide, and correspondingly, the size of the bounding volume 250 is reduced. Thus, the sample test efficiency does not decrease when the magnitude of motion increases in the present invention.

As noted, the present invention can be extended to support improve sample test efficiency in depth of field rendering as well. In this case, each frame buffer sample is further indexed with a lens position (u, v). It is therefore possible to optimize depth of field similarly to motion blur, with the exception that the resulting horizontal and vertical solutions are independent (not intersected); these bounds are referred to as u-bounds $[u_{min}, u_{max}]$ and v-bounds $[v_{min}, v_{max}]$ herein, and computed in place of $[t_{min},t_{max}]$ equations 2 and 3 above. Once these bounds are defined, a corresponding bounding volume for the particular tile can be constructed, and testing can be limited to the samples that are within the tile and the bounding volume, as further described below. Exemplary, stratified sampling in 2D is used to find the samples within the bounds, with the samples also indexed and arranged according to the lens dimensions (u,v).

Figure 3A:
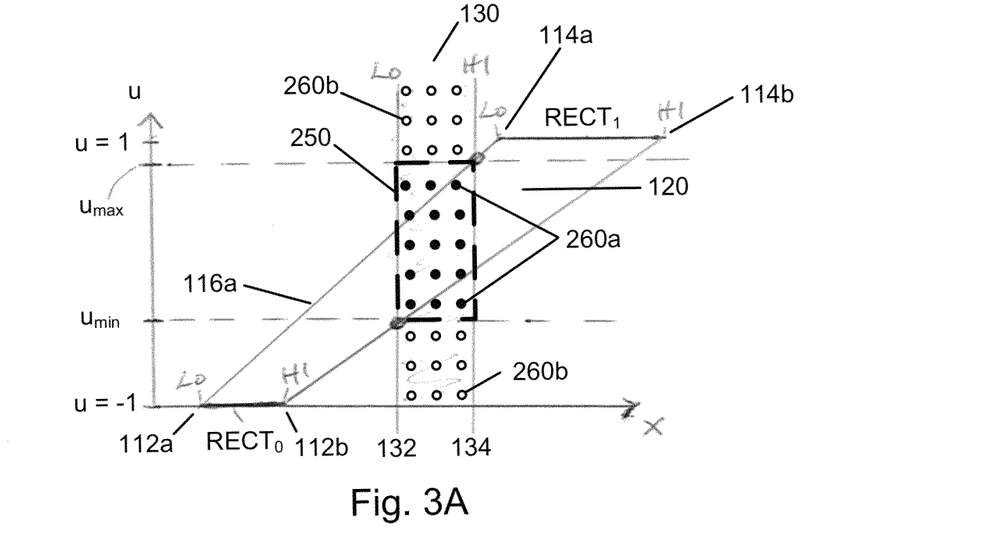
FIGS. 3A and 3B illustrate a bounding volume as a function of lens dimension (u) and (v), respectively, in accordance with the present invention.
Figure 3B:
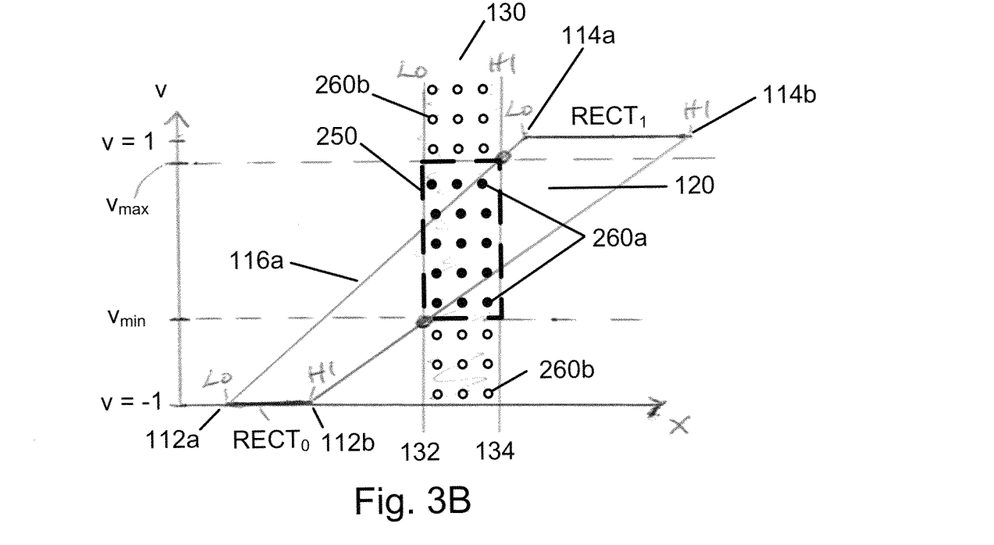

FIGS. 3A and 3B illustrate the bounding volume 250 as a function of the horizontal and vertical lens dimension (u) and (v), respectively, in accordance with the present invention. The screen space region (in the x-dimension in FIG. 3A and in the y-dimension in FIG. 3B) of tile 130 includes samples 260 (collectively, samples 260a and 260b) which may be tested. The samples 260 are arranged corresponding to different lens positions (u) or (v), i.e., different samples are available for testing when viewed for different lens positions (u) or (v) and at different locations within the tile 130. The samples are described as "available for testing," since one or more of the samples may not be tested, depending upon whether the bounding volume 250 overlaps those samples, as described below. Horizontal and vertical lens dimensions (u) and (v) extend along their respective axes between minimum and maximum values +1 to −1, as is the convention in the industry.

In FIG. 3A, the bounding volume is formed per tile 130 and includes screen space bounds $TILE_{LO}$ 132 and $TILE_{HI}$ 134 and the non-screen space bounds of $u_{min}$ and $u_{max}$ corresponding to the horizontal lens dimension coordinates. Similarly, the bounding volume of FIG. 3B is formed per tile 130, that bounding volume including screen space bounds $TILE_{LO}$ 132 and $TILE_{HI}$ 134 for tile 130 and the non-screen space bounds of $v_{min}$ and $v_{max}$ corresponding to the vertical lens dimension coordinates which produces apparent motion of the triangle. The computation of $u_{min}/u_{max}$ and $v_{min}/v_{max}$ is analogous to the computation of $t_{min}$ and $t_{max}$ in which above equations 2 and 3 are used to determine these respective u- and v-bounds.

As illustrated, the bounding volume 250 overlaps some of the samples included within the tile 130 (samples 260a, darkened), while other samples are not overlapped by the bounding volume 250 (samples 260b, undarkened). In this embodiment, and the primitive overlaps or extends over the region from apparent motion of the primitive. Advantageously, samples 260b which are included within the tile 130 and which are not overlapped by the bounding volume 250 are discarded or excluded from testing, thereby improving the sample test efficiency for the tile 130.

The construction of the bounding volume 250 has been described above in terms of a single non-screen space dimension. For example, the bounding volume 250 of FIG. 2 is constructed in the time dimension (t) to improve the sample test efficiency for time-dependent effects, such as motion blur. Similarly, the bounding volume 250 in each of FIGS. 3A and 3B is constructed in the horizontal or vertical lens dimension (u) and (v), respectively, to improve the sample test efficiency when rendering spatial-dependent effects, such as defocusing or a change in the camera's depth of field.

In another embodiment of the invention, the primitive's trajectory 120 is determined in terms of multiple non-space dimensions. In a particular embodiment, non-screen space dimensions of time and either horizontal or vertical lens dimensions (t,u) or (t,v) are combined with corresponding horizontal or vertical screen space dimensions to form two new coordinate systems (t,u,x) and (t,v,y) within which the primitive's trajectory and corresponding bounding volume are defined. Defining the primitive's trajectory in these new coordinate systems permits improved sample testing efficiency for an image having concurrent temporal- and spatial-dependent effects, e.g., simultaneous motion blur and depth of field effects.

Figure 4:
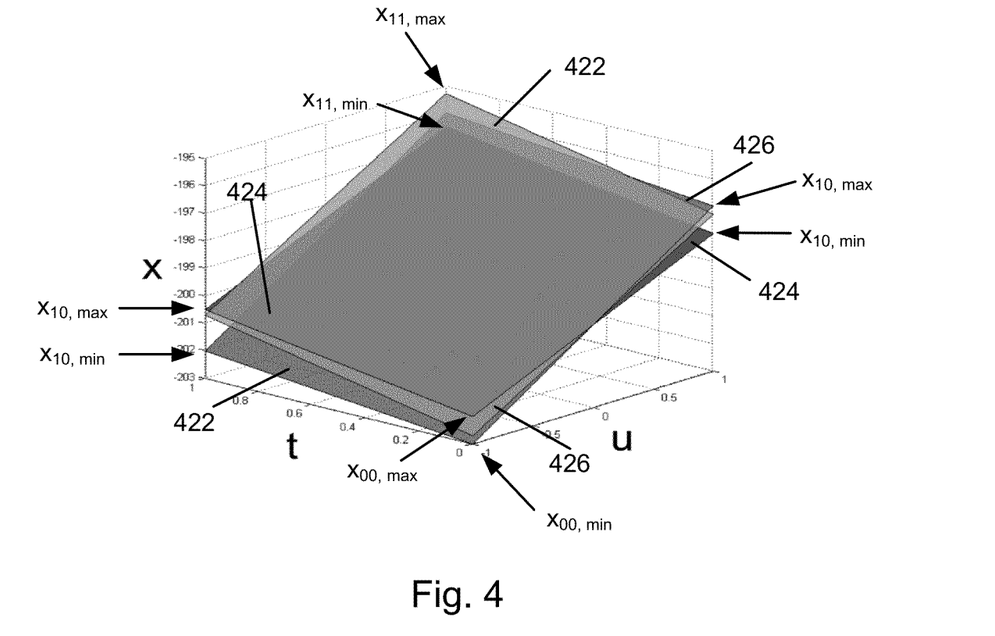
FIG. 4 illustrates surfaces formed from vertices of the triangle shown in FIGS. 1A and 1B within a (t,u,x) coordinate system in accordance with the present invention.

FIG. 4 illustrates surfaces formed from three vertices of the triangle shown in FIGS. 1A-1C in accordance with the present invention. The vertices form vertex surfaces 422, 424 and 426, each of which extend within a new (t,u,x) coordinate system over the time span $[t_0,t_1]$, and horizontal lens dimension $[u_{-1},u_{+1}]$. In particular, each vertex surface 422, 424 and 426 is formed by a respective one of the vertices of the triangle as the vertex moves (actual or apparent motion) through its (t,u,x) range. In addition, one or more of the vertex surfaces 422, 424 and 426 may be tilted with respect to time (t) or the horizontal lens dimension (u) if the vertex has horizontal motion or horizontal defocus, respectively. In such a case, two or more vertex surfaces may intersect because the surfaces' dependency on (t) and (u) may change the relative ordering of the vertices as they are seen on screen.

A trajectory of the triangle's motion in the x-plane can be determined from the FIG. 4. In one embodiment, minimum x-plane extents and maximum x-plane extents are identified from among the three vertex surfaces over all four corners of the (t,u) space, points $x_{00,min}$, $x_{01,min}$, $X_{10,min}$, and $x_{11,min}$, $x_{00,max}$, $x_{01,max}$, $X_{10,max}$, and $x_{11,max}$ identified in the illustrated embodiment. A lower trajectory boundary is then constructed by connecting the minimum x-plane extents, and an upper trajectory boundary constructed by connecting the maximum x-plane extents. A linear approximation can be made to connect the extents, although any function may be applied to define the trajectory's boundaries. The trajectory's upper and lower boundaries form the primitive's trajectory in the x-plane, defining the possible paths which the triangle 110 may take.

Although not shown, the primitive's trajectory intersects a screen space region (in this instance, along the x-plane), and thus the testing of samples within the region is necessary to render the tile 130. Exemplary, a bounding volume corresponding to the region between the upper and lower trajectory portions is constructed by limiting the x,y coordinates to lie within the screen space region which is to be rendered.

Figure 5:
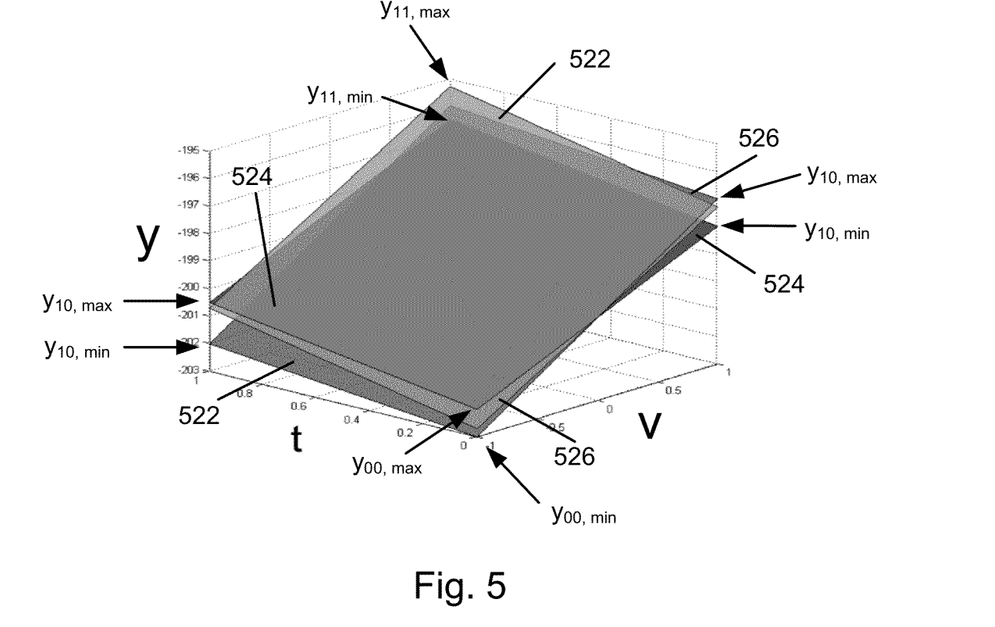
FIG. 5 illustrates surfaces formed from vertices of the triangle shown in FIGS. 1A and 1B within a (t,v,y) coordinate system in accordance with the present invention.

FIG. 5 illustrates surfaces formed from three vertices of the triangle shown in FIGS. 1A-1C in accordance with the present invention. The vertices form vertex surfaces 522, 524 and 526, each of which extend within a new (t,v,y) coordinate system over the time span $[t_0,t_1]$, and vertical lens dimension $[v_{-1},v_{+1}]$ In particular, each vertex surface 522, 524 and 526 is formed by a respective one of the vertices of the triangle as the vertex moves (actual or apparent motion) through its (t,v,y) range. One or more of the vertex surfaces may be tilted with respect to time (t) or the vertical lens dimension (v) if the corresponding vertex has vertical motion or vertical defocus, respectively.

As above in FIG. 4, a screen space trajectory of the triangle's motion in the y-plane can be determined, where in an exemplary embodiment minimum y-plane extents and maximum y-plane extents are identified from among the three vertex surfaces over all four corners of the (t,v) space, points $y_{00,min}$, $y_{01,min}$, $y_{10,min}$, and $y_{11,min}$, $y_{00,max}$, $y_{01,max}$, $y_{10,max}$, and $y_{11,max}$ identified in the illustrated embodiment. A lower trajectory boundary is then constructed by connecting the minimum y-plane extents, and an upper trajectory boundary constructed by connecting the maximum y-plane extents. A linear approximation can be made to connect the extents, although any function may be applied to define the trajectory's boundaries. The trajectory's upper and lower boundaries form the primitive's trajectory in the y-plane, defining the possible paths which the triangle 110 may take.

Although not shown, the screen space trajectory intersects a screen space region (in this instance, along the y-plane), and thus the testing of samples within the region is necessary to determine the render the tile 130. Exemplary, a bounding volume corresponding to the upper and lower trajectory portions is constructed by limiting the x,y coordinates to lie within the screen space region which is to be rendered.

Figure 6:
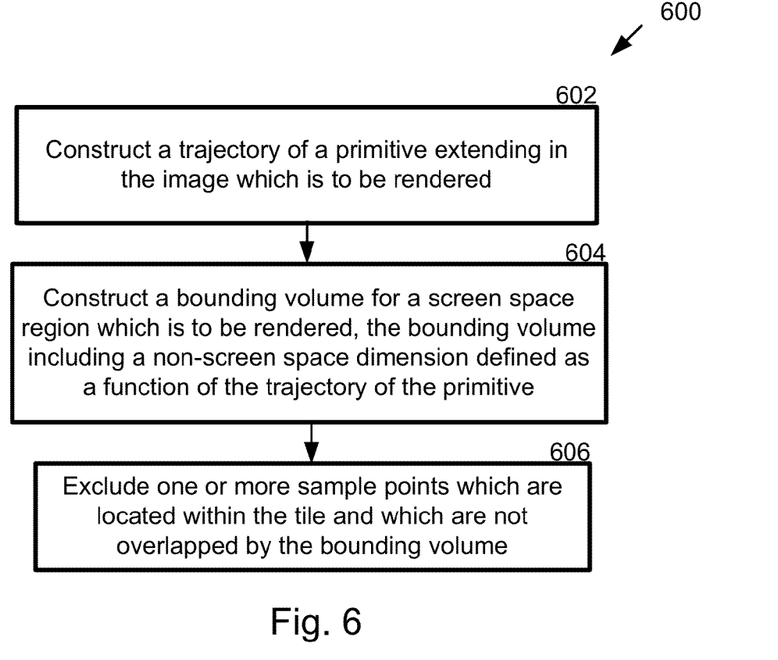
FIG. 6 illustrates an exemplary method for reducing the number of samples tested for rendering a region of an image in accordance with the present invention.

FIG. 6 illustrates an exemplary method 600 for reducing the number of samples tested for rendering a region of an image in accordance with the present invention. At 602, a trajectory (e.g., 120) is constructed for a primitive (e.g., 110) extending in an image which is to be rendered. Exemplary, the trajectory is defined by multiple points in screen space, for example, $RECT_{0,LO}$ $RECT_{0,HI}$ $RECT_{1,LO}$ $RECT_{1,HI}$ as shown in FIG. 2.

At 604, a bounding volume (e.g., 250) is constructed which overlaps a portion of a screen space region (e.g., 130) which is to be rendered. The bounding volume is characterized as having a non-screen space bound (e.g., $t_{min}$, $t_{max}$, $u_{min}$, $u_{max}$, $v_{min}$, $v_{max}$) which is computed as a function of the trajectory of the primitive. At 606, one or more sample points (e.g., 260b) which are located within the screen space region, and which are not overlapped by the bounding volume are excluded from testing.

As exemplified from the description of FIGS. 2, 3A, 3B, 4 and 5, the non-screen space dimension of the bounding volume may be selected from time (t), the horizontal lens dimension (u), and the vertical lens dimension (v). In the embodiments described for FIG. 2, the bounding volume may include the time dimension (t) in combination with either the horizontal or vertical screen space dimensions (x) or (y) to form a bounding volume in (t,x) or (t,y) coordinate systems, respectively. In additional embodiments described for FIGS. 3A and 3B, the bounding volume may include the horizontal lens dimension (u) in combination with horizontal screen space dimension (x), or in terms of the vertical lens dimension (v) in combination with the vertical screen space dimension (y), thereby forming a bounding volume in the (u,x) or (v,y) coordinate systems, respectively. In an embodiment described for FIG. 4, the bounding volume may include both time (t) and the horizontal lens dimension (u) in combination with the horizontal screen dimension (x) to form a bounding volume in a (t,u,x) coordinate system. In an embodiment described for FIG. 5, the bounding volume may include both time (t) and the vertical lens dimension (v) in combination with the vertical screen dimension (y) to form a bounding volume in a (t,v,y) coordinate system.

As exemplified from the description of FIGS. 1A, 1B, 4 and 5, operation 602 may be performed by determining first and second screen space positions of the primitive at respective first and second non-screen space indices, and constructing one or more interpolants extending therebetween. Further exemplary, each of the first and second screen space positions represent either a trailing edge (e.g., 112a) or a leading edge (112b) of the primitive. The interpolant(s) may be linear (as illustrated herein) or it may be non-linear, e.g., curvilinear in order to approximate perspective correct motion of the primitive. Exemplary embodiments of the interpolants and their computation are described in the commonly-owned concurrently filed U.S. patent application Ser. No. 13/168,771, filed Jun. 24, 2011, entitled "Bounding Box-Based Techniques for Improved Sample Test Efficiency in Image Rendering," herein incorporated by reference.

Further exemplary of operation 602, the primitive is approximated in screen space by a bounding polygon, exemplary embodiments of which include a bounding rectangle (examples of which are shown in FIGS. 1A and 1B), a bounding triangle, or any other type of polygon.

The bounding volume includes a non-screen space dimension (t), (u), or (v) and a screen space dimension (x) or (y), the latter having predefined bounds (shown as $TILE_{LO}$ and $TILE_{HI}$ in FIG. 2). Exemplary of operation 604, the bounding volume is constructed by determining minimum and maximums bound in the non-screen space as a function of the trajectory's screen space points, and forming a bounding volume which extends between those minimum and maximum bounds in the non-screen space dimension and between the predefined bounds of the screen space dimension. In a specific embodiment, the non-screen space bounds of the bounding volume are computed according to equations 2 and 3, above.

Exemplary of operation 606, a determination is made as to which samples within the tile are overlapped with the bounding volume, and excluding those sample not overlapped from testing. In a particular embodiment of this operation, the samples are arranged within the tile with increasing time, or lens dimensions (u,v), thus defining an area with increasing screen and non-screen space dimensions. The bounding volume also describes an area with an increasing screen and non-screen space dimensions for the trajectory of the primitive. The overlap of these two areas represents the samples which are possibly traversed by the triangle. Samples outside of this overlapped area are excluded from testing.

Exemplary, the method 600 is carried out for each of a plurality of primitives in order to improve the sample test efficiency for determining the color/transparency/reflectance of a tile (e.g., a pixel) which is overlapped by the plurality of primitives. Further exemplary, multiple primitives overlapping a particular region/pixel may be processed in parallel, whereby multiple instances of operations 602 and 604 (one instance for each primitive) are carried out concurrently.

In an exemplary application, the method of FIG. 6 is carried out as a part of a graphics pipeline process, e.g, as a part of a pixel shader program executed to compute the color/transmittance/reflectance of the screen space region, e.g., a fragment or a pixel. Execution time of the shader program is shortened due to the smaller number of samples tested, and as such the shader is able to compute the pixel's color faster without loss of accuracy. Further exemplary, the operations described in FIG. 6 may be performed in hardware, using e.g., an application specific integrated circuit (ASIC) or other circuit which is able to be configured to carry out the describe operations.

In another exemplary embodiment of method 600, operation 602 is carried out by constructing a trajectory of a primitive in camera space (x,y,w), as described in the Applicant's concurrently-filed U.S. patent application Ser. No. 13/168,784, filed Jun. 24, 2011, entitled "Clipless Time and Lens Bounds for Improved Sample Test Efficiency in Image Rendering," herein incorporated by reference. Further exemplary of such an embodiment, operation 604 is carried out by mapping each of a plurality of vertices of the primitive from camera space to dual space in which each vertex is represented as a vertex line, whereby a plurality of vertex lines are generated. The plurality of vertex lines are bound in dual space with first and second bounding lines, and t-bounds $[t_{min}, t_{max}]$ are computed therefrom. The t-bounds are then used to generate a bounding volume which overlaps a portion of the screen space to be rendered. Operation 606 is carried out as described, whereby sample points which are included within the screen space region but are not overlapped by the bounding volume are excluded from testing.

Figure 7:
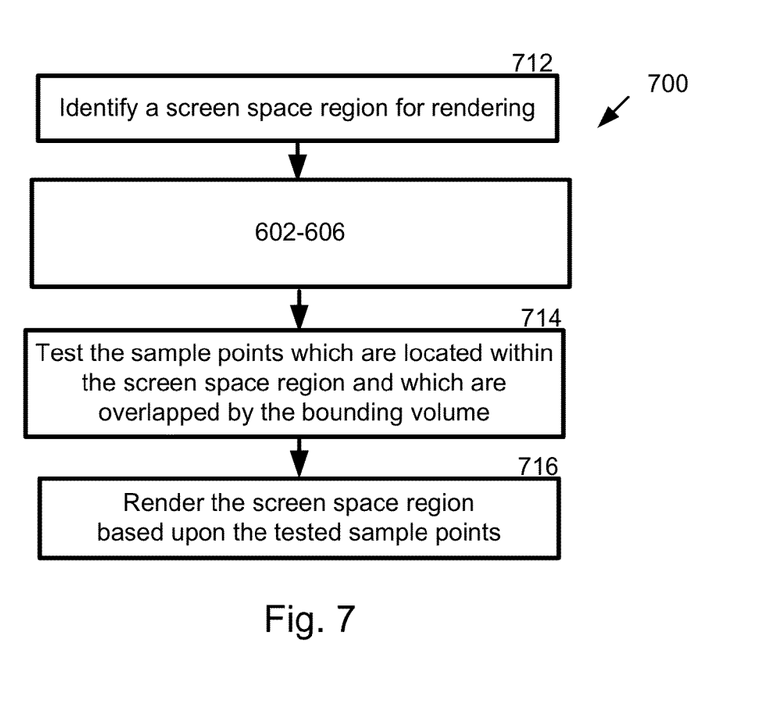
FIG. 7 illustrates an exemplary method for rendering a region of an image in accordance with the present invention.

FIG. 7 illustrates a method for rendering a region of an image which incorporates method 600. At 712, a screen space region which is to be rendered is identified. This process may be performed automatically during image rendering, as successive regions (e.g., pixels) of an image which is to be rendered are selected one after another, or it may occur manually, for example, if the viewer manually selects a region which is to be viewed. The method 700 continues with the implementation of operations 602, 604 and 606 as described, and implemented in accordance with one or more of the exemplary embodiments described herein. At 714, the samples which are located within the screen space region, and which are overlapped by the bounding volume of the primitive are tested. At 716, the screen space region of the image is rendered based upon the tested samples. Exemplary embodiments of operation 716 include implementing a shader program operable to compute the color/transmittance/reflectance of the screen space region based upon the tested samples within that region and overlapped by the bounding volume. Further exemplary, the method 700 is repeated one or more times to render multiple regions of the image or the entire image. As used herein, the term "render" refers to the output of the screen space region/image in a visually comprehensible format (e.g., displayed on a monitor, printed on a medium, etc.), as well as the process of storing the data corresponding to such a region/image in electronic form, e.g. in a render target, such as a frame buffer.

Figure 8:
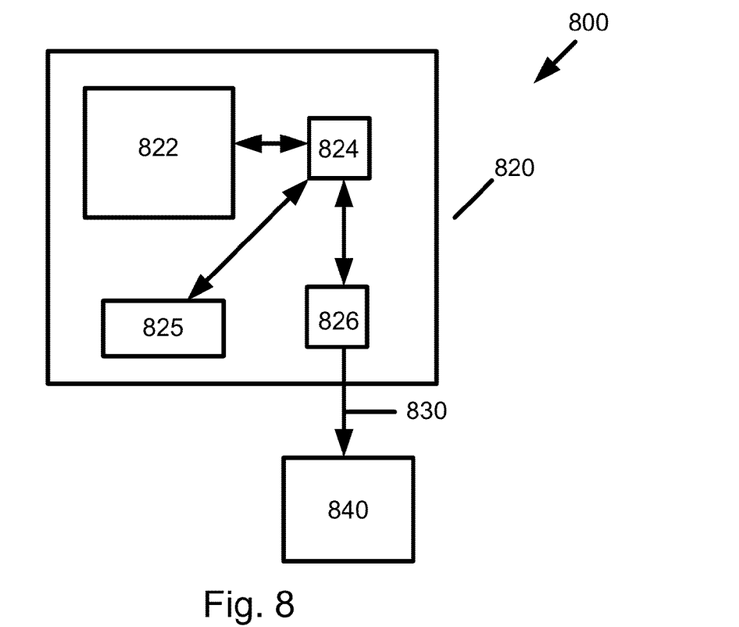
FIG. 8 illustrates an exemplary system in which the methods described for FIGS. 1A-7 finds utility in accordance with the present invention.

FIG. 8 illustrates an exemplary system 800 in which the methods described for FIGS. 1A-7 finds utility in accordance with the present invention. The system 800, exemplary a computer system, includes a graphics processing sub-system 820 and an output device 840, such as a monitor or printer. The graphics processing sub-system 820 includes a processor 822, a memory interface 824, a frame buffer 825, and a scanout processor 826. The processor 822 is operable to perform any or all of the operations described for FIGS. 1A-7 herein, and is a parallel processing architecture in an exemplary embodiment. A frame buffer 826 is operably coupled to the processor 822 for receiving rasterized and/or raytraced fragment values for each frame, and for reading out a composite image of each frame to the output device 840 via memory interface 824 and link 830 (e.g., a DVI link). In a specific embodiment, the processor 822 is operable to carry out one, several, or all of the operations described for any one, several or more of FIGS. 1A-7. Further, the processor 822 may include local memory operable to store instruction code for performing the methods described in FIGS. 1A-7. In an alternative embodiment, system 800 may take on different forms (e.g., a personal digital assistant, an internet device, a mobile telephone, or other mobile device), and processor 820 may be an embedded in such different systems. Further alternatively, the processor 822 may take the form of an application specific integrated circuit or other hardware/firmware circuit operable to carry out the operations described for any one, several, or all of FIGS. 1A-7.

In one embodiment, system 800 is operable to reduce the number of samples tested for rendering a region of an image in accordance with the present invention. In this embodiment, the system 800 includes a processor 822 operable to perform one or more of the operations described for FIG. 6, and one or more of the operations described for FIG. 7.

As readily appreciated by those skilled in the art, the described processes and operations may be implemented in hardware, software, firmware or a combination of these implementations as appropriate. In addition, some or all of the described processes and operations may be carried out as a computer-implemented method, or as computer readable instruction code resident on a computer readable medium, the instruction code operable to control a computer of other such programmable device to carry out the intended functions. The computer readable medium on which the instruction code resides may take various forms, for example, a removable disk, volatile or non-volatile memory, etc.

In a particular embodiment of the invention, a memory (which may be included locally within the processor 822 or globally within system 800) is operable to store instructions for performing any of the operations described for FIGS. 1A-7. The memory may take various forms, e.g., a removable disk, an embedded memory, etc., in volatile or non-volatile form, and may be included within a variety of different systems, e.g. a computer system, an embedded processor, a graphics processor, or graphics processing sub-system, such as a graphics card.

Figure 9:
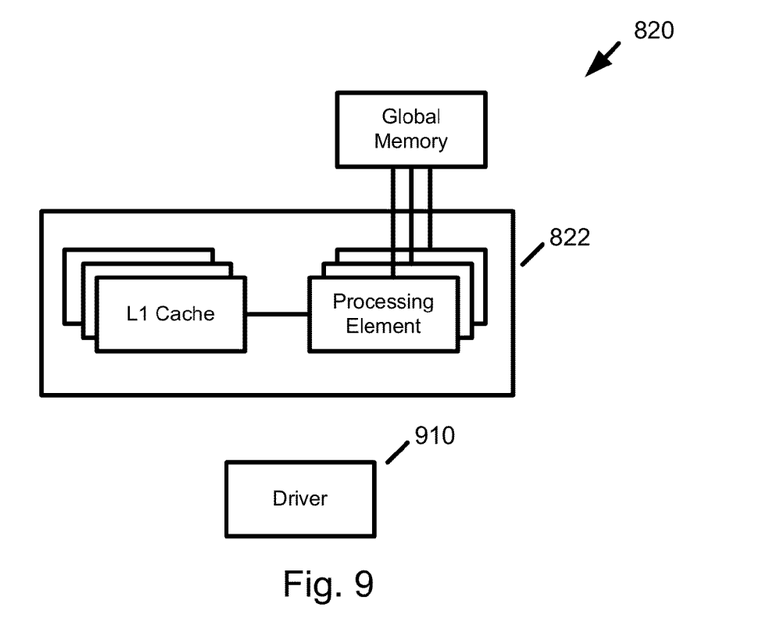
FIG. 9 illustrates an exemplary graphics processing subsystem shown in FIG. 8 in accordance with the present invention.

FIG. 9 illustrates an exemplary graphics processing sub-system 820 of FIG. 8 in accordance with the present invention. The graphics processing sub-system 820 includes parallel processing elements and their associated local L1 caches, as well as a global memory block which is operable to store instructions for carrying out the methods described for FIGS. 1A-7. The sub-system 820 may further include one or more drivers 910 for controlling the operation of the sub-system 820 in accordance with the methods described herein. In one embodiment, the sub-system 820 is included within in a graphics card. In another embodiment, the sub-system 820 is included within the motherboard of a computer or workstation or on a game console. In another embodiment, the sub-system 820 is realized in an embedded system, such as in a cellular telephone.

The terms "a" or "an" are used to refer to one, or more than one feature described thereby. Furthermore, the term "coupled" or "connected" refers to features which are in communication with each other, either directly, or via one or more intervening structures or substances. The sequence of operations and actions referred to in method flowcharts are exemplary, and the operations and actions may be conducted in a different sequence, as well as two or more of the operations and actions conducted concurrently. Reference indicia (if any) included in the claims serves to refer to one exemplary embodiment of a claimed feature, and the claimed feature is not limited to the particular embodiment referred to by the reference indicia. The scope of the clamed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method for reducing the number of sample points tested for rendering a screen space tile of an image, the method comprising:
   constructing a trajectory of a primitive extending within an image which is to be rendered, the screen space tile including a plurality of sample points distributed thereover;
   determining low and high bounds in a non-screen space dimension for the screen space tile of the image which is to be rendered by using points of the trajectory of the primitive;
   constructing a bounding volume for the screen space tile of the image by using the low and high bounds in the non-screen space dimension for the screen space tile, wherein the bounding volume includes a first dimension that extends between the low and high bounds in the non-screen space dimension that are defined as a function of the trajectory of the primitive, and wherein the bounding volume overlaps a portion of the screen space tile; and
   excluding from testing, one or more sample points which are located within the screen space tile, and which are not overlapped by the bounding volume.

2. The method of claim 1, wherein the non-screen space dimension of the bounding volume is selected from the group consisting of time (t), horizontal lens dimension (u), and vertical lens dimension (v).

3. The method of claim 2, wherein said constructing a trajectory comprises:
   determining first and second screen space positions of the primitive at respective first and second time indices; and
   constructing a trajectory extending between the first and second screen space positions of the primitive.

4. The method of claim 2, wherein said constructing a trajectory comprises:
   determining first and second screen space positions of the primitive at respective first and second lens positions (u,v); and
   constructing a screen space trajectory extending between the first and second screen space positions of the primitive.

5. The method of claim 2, wherein the bounding volume for the primitive is constructed in one of the coordinate systems selected from the group consisting of (t,x), (t,y), (u,x), (v,y), (t,u,x) and (t,v,y).

6. The method of claim 1, wherein said constructing a bounding volume comprises
   defining the non-screen space bound of the bounding volume as function of a distance between two screen space points of the trajectory of the primitive.

7. A method for rendering a screen space tile of an image, comprising:

identifying a screen space tile of an image which is to be rendered, the screen space tile including a plurality of sample points distributed thereover;

constructing a trajectory of a primitive extending within the image;

determining low and high bounds in a non-screen space dimension for the screen space tile by using points of the trajectory of the primitive;

constructing a bounding volume for the screen space tile by using the low and high bounds in the non-screen space dimension for the screen space tile, wherein the bounding volume includes a first dimension that extends between the low and high bounds in the non-screen space dimension that are defined as a function of the trajectory of the primitive, and wherein the bounding volume overlaps a portion of the screen space tile;

excluding from testing, one or more sample points which are located within the screen space tile, and which are not overlapped by the bounding volume;

testing the sample points which are located within the screen space tile and which are overlapped by the bounding volume; and rendering the screen space tile of the image based upon the tested sample points.

8. The method of claim 7, wherein the non-screen space dimension of the bounding volume is selected from the group consisting of time (t), horizontal lens dimension (u), and vertical lens dimension (v).

9. The method of claim 8, wherein said constructing a trajectory comprises:
determining first and second screen space positions of the primitive at respective first and second time indices; and
constructing a screen space trajectory extending between the first and second screen space positions of the primitive.

10. The method of claim 8, wherein said constructing a trajectory comprises:
determining first and second screen space positions of the primitive at respective first and second lens positions (u,v); and
constructing a screen space trajectory extending between the first and second screen space positions of the primitive.

11. The method of claim 8, wherein the bounding volume for the primitive is constructed in one of the coordinate systems selected from the group consisting of (t,x), (t,y), (u,x), (v,y), (t,u,x) and (t,v,y).

12. The method of claim 7, wherein said constructing a bounding volume comprises
defining the non-screen space bound of the bounding volume as function of the distance between two screen space points of the trajectory of the primitive.

13. A system operable to reduce the number of sample points tested for rendering a screen space tile of an image, the system including a processor operable to:
construct a trajectory of a primitive extending within an image which is to be rendered, the screen space tile including a plurality of sample points distributed thereover;
determine low and high bounds in a non-screen space dimension for the screen space tile of the image which is to be rendered by using points of the trajectory of the primitive;
construct a bounding volume for the screen space tile of the image by using the low and high bounds in the non-screen space dimension for the screen space tile, wherein the bounding volume includes a first dimension that extends between the low and high bounds in the non-screen space dimension that are defined as a function of the trajectory of the primitive, and wherein the bounding volume overlaps a portion of the screen space tile; and
exclude from testing, one or more sample points which are located within the screen space tile, and which are not overlapped by the bounding volume.

14. The system of claim 13, wherein the non-screen space dimension of the bounding volume is selected from the group consisting of time (t), horizontal lens dimension (u), and vertical lens dimension (v).

15. The system of claim 14, wherein the processor is further operable to:
determine first and second screen space positions of the primitive at respective first and second time indices; and
construct a screen space trajectory extending between the first and second screen space positions of the primitive.

16. The system of claim 14, wherein the processor is further operable to:
determine first and second screen space positions of the primitive at respective first and second lens positions (u,v); and
construct a screen space trajectory extending between the first and second screen space positions of the primitive.

17. A system operable to render a screen space tile of an image, the system including a processor operable to:
identify a screen space tile of an image which is to be rendered, the screen space tile including a plurality of sample points distributed thereover;
construct a trajectory of a primitive extending within the image;
determine low and high bounds in a non-screen space dimension for the screen space tile by using points of the trajectory of the primitive;
construct a bounding volume for the screen space tile by using the low and high bounds in the non-screen space dimension for the screen space tile, wherein the bounding volume includes a first dimension that extends between the low and high bounds in the non-screen space dimension that are defined as a function of the trajectory of the primitive, and wherein the bounding volume overlaps a portion of the screen space tile;
exclude from testing, one or more sample points which are located within the screen space tile, and which are not overlapped by the bounding volume;
test the sample points which are located within the screen space tile and which are overlapped by the bounding volume; and
render the screen space tile of the image based upon the tested sample points.

18. The system of claim 17, wherein the non-screen space dimension of the bounding volume is selected from the group consisting of time (t), horizontal lens dimension (u), and vertical lens dimension (v).

19. The system of claim 18, wherein the processor is further operable to:
determine first and second screen space positions of the primitive at respective first and second time indices; and
construct a screen space trajectory extending between the first and second screen space positions of the primitive.

20. The system of claim 18, wherein the processor is further operable to:
determine first and second screen space positions of the primitive at respective first and second lens positions (u,v); and construct a screen space trajectory extending between the first and second screen space positions of the primitive.

21. A computer program product, resident on a non-transitory computer-readable medium, and operable to store instructions for reducing the number of sample points tested for rendering a screen space tile of an image, the computer program product comprising:
   instruction code for constructing a trajectory of a primitive extending within an image which is to be rendered, the screen space tile including a plurality of sample points distributed thereover;
   instruction code for determining low and high bounds in a non-screen space dimension for the screen space tile of the image which is to be rendered by using points of the trajectory of the primitive;
   instruction code for constructing a bounding volume for the screen space tile of the image by using the low and high bounds in the non-screen space dimension for the screen space tile, wherein the bounding volume includes a first dimension that extends between the low and high bounds in the non-screen space dimension that are defined as a function of the trajectory of the primitive, and wherein the bounding volume overlaps a portion of the screen space tile; and
   instruction code for excluding from testing, one or more sample points which are located within the screen space tile, and which are not overlapped by the bounding volume.

22. A computer program product, resident on a non-transitory computer-readable medium, and operable to store instructions for rendering a screen space tile of an image, the computer program product comprising:
   instruction code for identifying a screen space tile of an image which is to be rendered, the screen space tile including a plurality of sample points distributed thereover;
   instruction code for constructing a trajectory of a primitive extending within the image;
   instruction code for determining low and high bounds in a non-screen space dimension for the screen space tile by using points of the trajectory of the primitive;
   instruction code for constructing a bounding volume for the screen space tile by using the low and high bounds in the non-screen space dimension for the screen space tile, wherein the bounding volume includes a first dimension that extends between the low and high bounds in the non-screen space dimension that are defined as a function of the trajectory of the primitive, and wherein the bounding volume overlaps a portion of the screen space tile;
   instruction code for excluding from testing, one or more sample points which are located within the screen space tile, and which are not overlapped by the bounding volume;
   instruction code for testing the sample points which are located within the screen space tile and which are overlapped by the bounding volume; and
   instruction code for rendering the screen space tile of the image based upon the tested sample points.

\* \* \* \* \*